United States Patent [19]
Zagoroff

[11] Patent Number: 5,379,617
[45] Date of Patent: Jan. 10, 1995

[54] AUTOMOBILE ANTI-THEFT DEVICE

[75] Inventor: Dimiter S. Zagoroff, Cambridge, Mass.

[73] Assignee: Steadfast Corporation, Chelsea, Mass.

[21] Appl. No.: 24,413

[22] Filed: Mar. 1, 1993

[51] Int. Cl.⁶ ............................................. E05B 17/18
[52] U.S. Cl. ......................................... 70/18; 70/417; 70/455
[58] Field of Search .................. 70/18, 237, 417, 455, 70/423–428, 416, 238, 239

[56] References Cited

U.S. PATENT DOCUMENTS

| | | | |
|---|---|---|---|
| 2,126,391 | 8/1938 | Jacobi | 70/417 |
| 2,225,703 | 12/1940 | Machinist | 70/417 |
| 4,074,552 | 2/1978 | Smith | 70/417 |
| 4,094,177 | 6/1978 | Wellekens | 70/423 |
| 4,160,368 | 7/1979 | Solow | 70/417 |
| 4,167,222 | 9/1979 | El Bindari | 70/417 X |
| 4,530,223 | 7/1985 | Oliver | 70/417 |
| 4,549,418 | 10/1985 | Hall | 70/417 X |
| 5,036,683 | 8/1991 | Geuvjehizian | 70/18 |
| 5,063,765 | 11/1991 | Squire et al. | 70/417 |
| 5,212,970 | 5/1993 | Harrell | 70/18 |

Primary Examiner—Peter M. Cuomo
Assistant Examiner—Suzanne L. Dino
Attorney, Agent, or Firm—Cesari and McKenna

[57] ABSTRACT

An anti-theft device surrounds the plastic housing for the ignition switch, the protruding plastic lock barrel and the exposed end of the lock cylinder with hardened steel. The device consists of (i) a hardened steel bracket which attaches directly to the housing and the steering column with screws, (ii) a cup-like cover which attaches to the bracket, covering the housing, the screws and the protruding lock barrel with hardened steel, and (iii) a torque-sensitive end cap which is rotateably supported by the cover. The torque-sensitive cap consists of an outer sleeve and a center disk press fit into the sleeve. The disk includes a key slot for access to the lock cylinder. The disk is the same size as an opening in the cover, which accommodates key access to the lock cylinder. The sleeve is rigid and larger in diameter than the opening. An indentation in the cap sleeve engages a boss on the lock cylinder to align the slot in the disk with the lock cylinder keyhole and operate the lock. If a thief attempts to insert a screwdriver through the slot to rotate the cap and force the rotation of the lock cylinder, the disk alone rotates without operating the lock cylinder.

2 Claims, 3 Drawing Sheets

AUTOMOBILE ANTI-THEFT DEVICE

FIELD OF INVENTION

The invention relates generally to automobile anti-theft devices and more particularly to an anti-theft device for preventing unauthorized access to an automobile ignition switch.

BACKGROUND

One manufacturer has redesigned an automobile ignition switch mechanism and enclosed it and the ignition lock in a plastic housing. The housing includes a protruding lock barrel which surrounds the ignition lock cylinder. An opening in the housing, at one end of the lock barrel, exposes the keyhole end of the lock cylinder. A driver inserts a key into the keyhole to unlock the ignition lock and operate the ignition switch.

A thief must enter the housing to gain access to the switch. Unfortunately, the plastic housing is not tamper-proof and a thief can gain access to the ignition switch either by forceably removing the lock cylinder from the housing through the opening and thereby freeing the switch, or by inserting a screwdriver into the exposed keyhole and forceably rotating the cylinder to unlock and operate the switch.

Various devices have been designed to prevent unauthorized access to the lock cylinder. One such device is described in U.S. Pat. No. 5,063,765 to Squire et al. It comprises a lock barrel protector, having an end cap which fits over the otherwise exposed keyhole end of the cylinder and provides a guarded passageway for the ignition key. A "retaining means," such as a set screw, holds the protector in place. The device slides over and attaches to the lock barrel which surrounds the lock cylinder, with the set screw embedded in the lock barrel to prevent removal of the device.

The Squire et al. device works well with locks having metallic barrels. It does not work well with locks which have plastic barrels, such as the locks described above. To defeat this lock protection device, a thief can puncture the plastic barrel to disable or detach the set screw, and remove the device. The thief then has direct access to the lock cylinder and, ultimately, to the ignition switch.

SUMMARY OF THE INVENTION

The invention is an anti-theft device which surrounds the plastic housing for the ignition switch, the protruding plastic lock barrel and the exposed end of the lock cylinder with hardened steel, rendering the housing and lock virtually inaccessible except to the ignition key. This anti-theft device consists of (i) a bracket which attaches directly to the housing and the steering column with screws, (ii) a cup-like cover which attaches to the bracket, covering the housing, the screws which attach the bracket and the housing to the steering column and the protruding lock barrel with hardened steel, and (iii) a novel torque-sensitive end cap which is rotateably supported by the cover and which shields the otherwise exposed end of the lock cylinder. To gain access to the ignition switch without the ignition key, a thief must detach the cover from the bracket, while the cover is in place on the steering column. If break-away, or one-way, screws are used to secure the cover to the bracket, access to the ignition switch cannot be gained without drilling out the screws. The removal of the device thus takes too much time and effort to interest a thief.

The torque-sensitive cap, which can be manufactured relatively easily and inexpensively, consists of a center disk, which includes a key-sized slot, and an outer sleeve. The center disk is press fit into the sleeve to form the cap. The disk is the same size as an opening in the cover, which accommodates key access to the lock cylinder. The sleeve is larger in diameter than the opening and rigid, and thus, the cap cannot be re-shaped and forceably pulled through the opening when the cover is in place on the housing.

An indentation in the cap sleeve engages a boss on the lock cylinder to align the slot in the disk with the lock cylinder keyhole. The aligned slot thus forms a passageway to accommodate the ignition key. The cap and the lock cylinder then operate together, to unlock the lock and operate the ignition switch, when a torque is applied to the key and/or a protective bezel attached to the cap.

The disk is relatively thick, and thus, the end of the slot into which a key is inserted is separated from the lock cylinder. The slot in the cap is no wider than necessary to accommodate the ignition key. Accordingly, a conventional screw driver inserted into the slot may not extend far enough through the slot to reach the lock cylinder. An instrument which is more slender than a screwdriver may reach the lock cylinder, however, this instrument will break rather than overpower the lock cylinder.

If a thief attempts to insert a screwdriver through the slot to rotate the cap and force the rotation of the lock cylinder, the disk alone rotates without operating the lock cylinder. The thief is thus prevented from unlocking the ignition switch.

DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
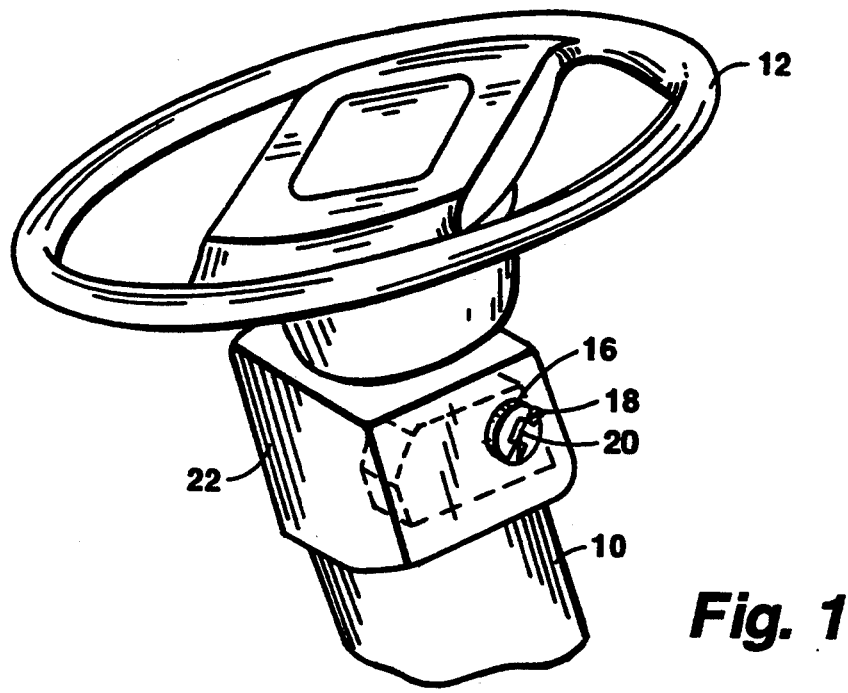
FIG. 1 depicts an automobile steering column and illustrates the location of the housing within the column.

FIG. 1 depicts a steering column 10 which supports a steering wheel 12. The column 10 supports a plastic housing 14 (depicted by dotted lines) which encloses an ignition switch and an ignition switch lock. The housing includes a protruding plastic lock barrel 16, which surrounds a lock cylinder and leaves the keyhole end of the cylinder exposed and accessible to the ignition key. A bezel 18, with a passageway 20 for the ignition key, covers the exposed end of the lock cylinder and engages a boss 23 (FIG. 6) on the cylinder. The bezel 18 both facilitates the unlocking of the ignition lock with the key and protects the key against over-rotation. A plastic shroud 22 with a cut-out for the protruding lock barrel covers the steering column 10 and the housing 14.

A thief may gain access to the ignition switch mechanism by inserting an instrument such as a screwdriver into the bezel passageway 20 and down into the lock cylinder, and forceably rotating the cylinder to unlock the ignition switch. Alternatively, he may pry the lock cylinder from the barrel 16 and insert an instrument through the barrel and directly into the housing to operate the switch.

Figure 2:
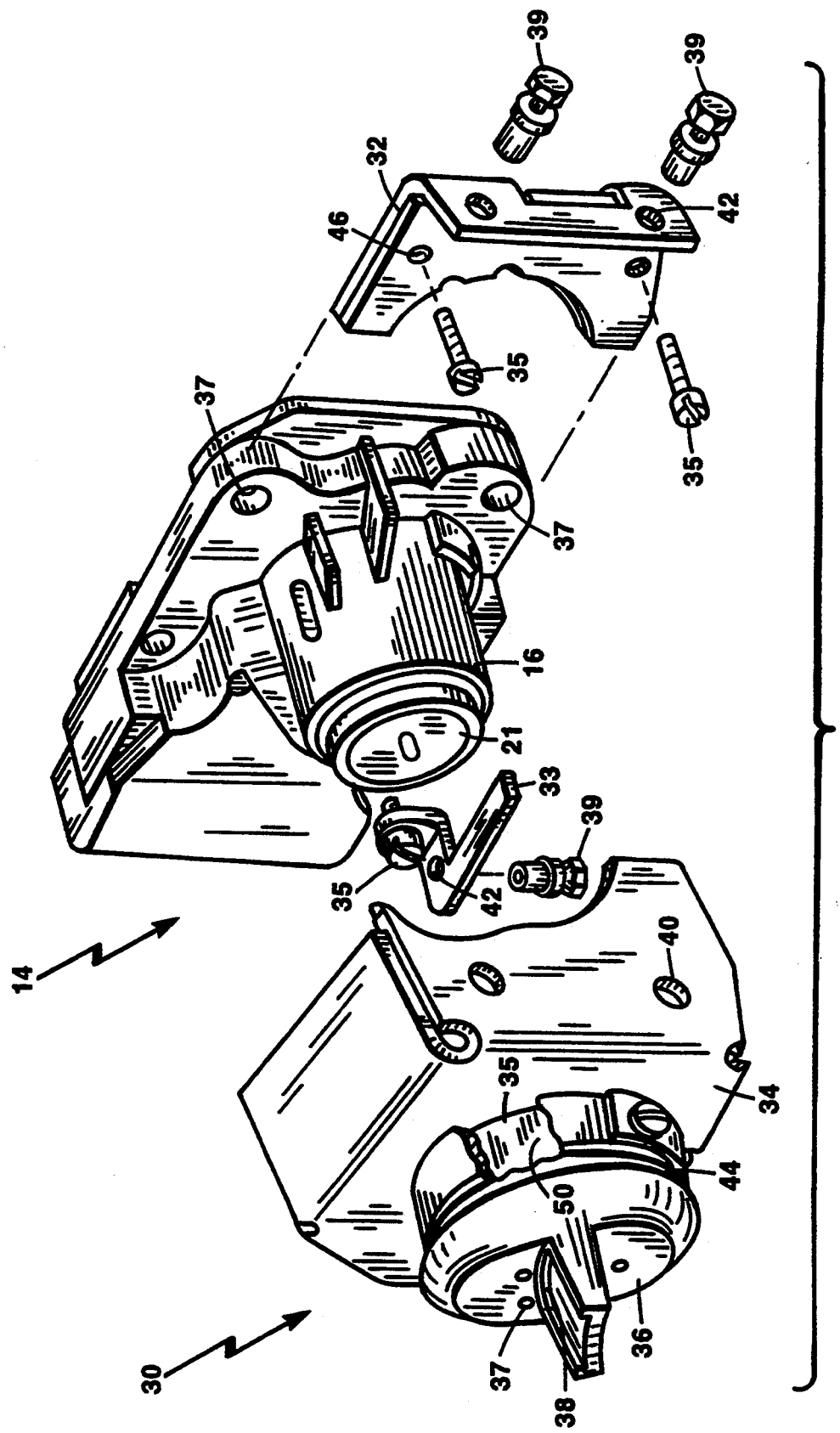
FIG. 2 depicts an anti-theft device constructed in accordance with the invention and its position relative to the ignition housing of FIG. 1.

Referring to FIG. 2, to prevent unauthorized access to the ignition switch mechanism, a hardened steel anti-theft device 30 attaches to and shields the housing 14 and the lock barrel 16. The anti-theft device 30 includes a cup-like cover 34, which fits over the housing 14 and the lock barrel 16, and brackets 32–33 which secure the cover 34 to the housing 14. The cover 34 includes an opening 35 for insertion of the ignition key into the lock cylinder 21.

A torque-limiting cap 50 with a slot 54 for the ignition key (shown in more detail in FIGS. 3 and 4) fills the opening 35, providing a guarded passageway for the ignition key and preventing other instruments from gaining access to the lock cylinder 21. A bezel 36 which includes a key passageway 38, attaches to the cap with screws 37. The key passageway 38 in the bezel 36 aligns with the slot 54 in the end cap 50 to extend the key passage way to the lock cylinder. This passageway accommodates the ignition key, but is too narrow to permit the full insertion of a conventional screwdriver.

The brackets 32–33 attach directly to the housing 14 with screws 35, which are inserted through mounting holes 37 in the housing and are threaded into the steering column. The cup-like cover 34 then attaches to the brackets with break-away, or one-way, screws which are inserted through clearance holes 40 and threaded into holes 42 in the brackets. When the cover 34 is attached to the brackets, it prevents access to the screws 35, which prevents removal of the brackets from the steering column 10 (FIG. 1).

The anti-theft device 30 may also include a translucent ring 44, for illuminating of the key passageway 38. This ring is lit by a light bulb (not shown), which is powered through the steering column and inserted behind the ring. The ring 44 corresponds to a ring provided by the automobile manufacturer and may be included as part of the anti-theft device to match the appearance of exposed portion of the device to that of the original lock mechanism.

Figure 3:
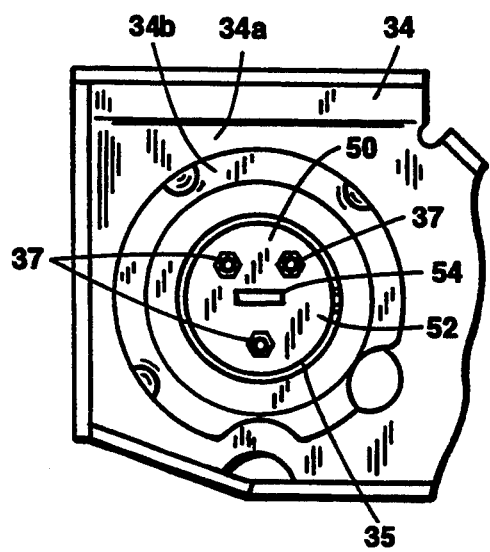
FIG. 3 depicts the underside of the anti-theft device of FIG. 2, and includes one embodiment of a torque-sensitive end cap.

The underside of the cover 34 is depicted in FIG. 3. One end of the section 34b of the cover which shields the lock barrel 16 (FIG. 2) is permanently attached, shown here as welded, to the underside of the top section 34a of the cover. The end cap 50 fits into the opening 35 at the opposite end of the section 34b, and the bezel 36 (FIG. 2) is attached to the side of the cap which is hidden from view with screws 37.

Figure 4:
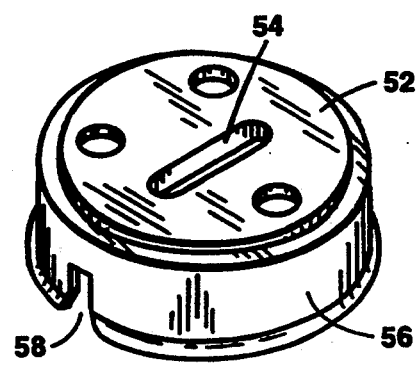
FIG. 4 depicts the end cap of FIG. 3 in more detail.

The cap 50, which is depicted in more detail in FIG. 4, includes a disk 52 with a key slot 54 and a larger diameter sleeve 56. The disk 52 is press fit into the sleeve 56 such that a portion of the disk extends out, past the end of the sleeve. The disk 52 is sized to fit the opening 35 (FIG. 4), while the sleeve 56, with its larger diameter, prevents the cap from being forced through the opening 35. The disk 52 and the sleeve 56 are both rigid, so that a thief can not forceably deform either of them in an attempt to fit the cap through the opening 35.

The sleeve 56 includes an indentation 58, which mates with the boss 23 on the lock cylinder 21 (FIG. 2) to align the key slot 54 and the keyhole in the lock cylinder 21 to accommodate the ignition key. The cap 50 and the lock cylinder then operate together.

As discussed above with reference to FIG. 2, the slot 54 is narrow such that while it accommodates the ignition key, it does not fully accommodate instruments such as screwdrivers. Further, since the disk is relatively thick, the slot is deep and the accessible end of the slot is separated from the lock cylinder keyhole. Accordingly, the tip of a conventional screwdriver inserted into slot does not reach the lock cylinder keyhole. If a thief inserts the tip of a screwdriver into the slot 54 and attempts to force the rotation of cap 50, and thus, the lock cylinder 21 (FIG. 2), by applying a sufficiently large torque, the disk 52 turns within the sleeve 56, without turning the lock cylinder. If a thief inserts an instrument which is more slender than the screwdriver into the slot the instrument reaches the lock cylinder, however, the instrument is so slender it will break rather than overpower the lock cylinder, when a large torque is applied.

Figure 5:
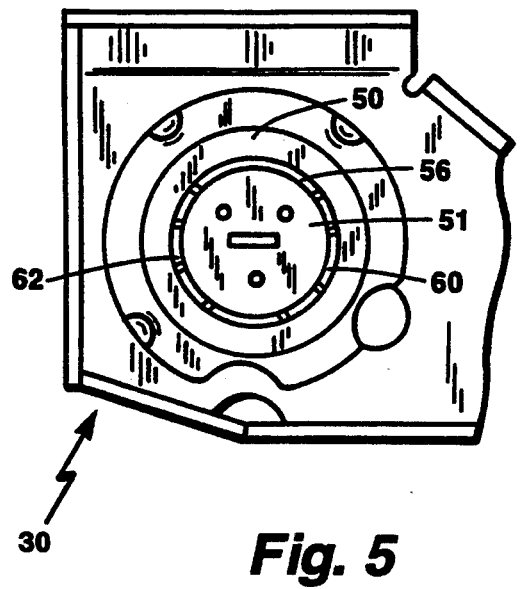
FIG. 5 is a view of the underside of the anti-theft device depicted in FIG. 3 with an alternative end cap.

FIG. 5 depicts the ant-theft device 30 with an alternative cap 51. The cap 51 is similar in shape to the cap 50 depicted in FIGS. 2 and 4, except that it includes two indentations 60 and 62, which are shaped and positioned to engage two flanges (not shown) which are part of an alternative lock cylinder design. The cap 51 includes the same disk 52, which rotates inside the sleeve 56 a torque sufficiently larger than that required to operate the lock with the key is applied to the cap 51.

Figure 6:
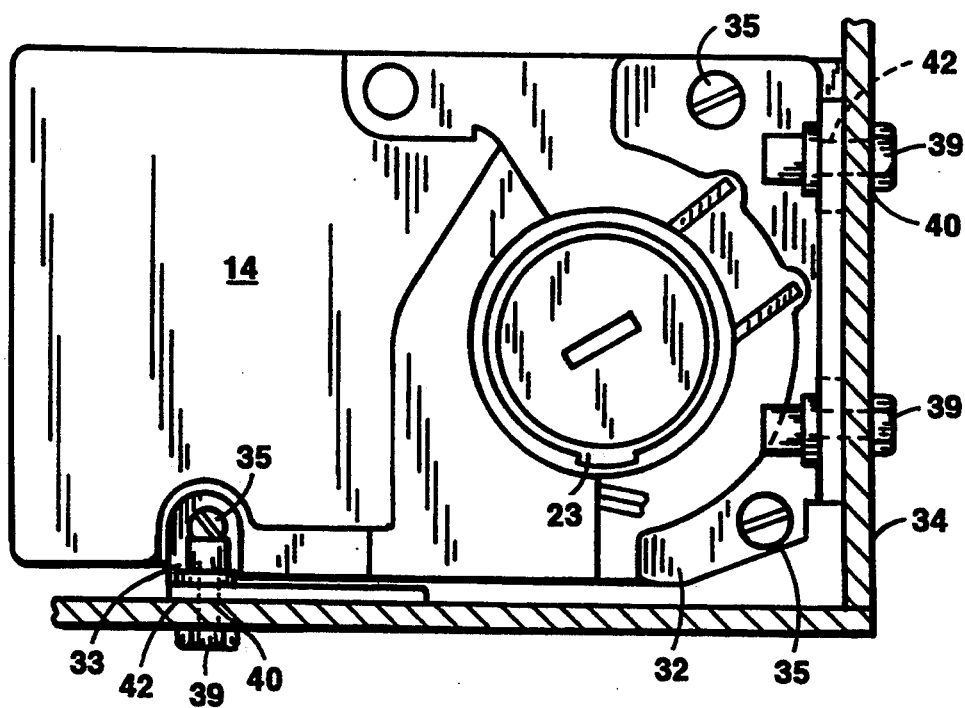
FIG. 6 is an illustration of the housing with brackets for supporting the anti-theft device attached thereto.

Referring to FIGS. 2 and 6, to install the anti-theft device 30, a user removes the housing 14 from steering column 10 (FIG. 1) and attaches the brackets 32 and 33 to the housing with screws 35. The screws 35 feed through the clearance holes 46 in the brackets, the mounting holes 37 in the housing and into threaded mounting holes (not shown) in the steering column. The user then slides the cover 34 over the housing 14, such that the screws 35, the top and sides of the housing 14 and the length of the lock barrel 16 are thus covered with hardened steel. The cap 50 and bezel 36 which are supported by the cover 34 fit over separated from the lock cylinder keyhole. Accordingly, the tip of a conventional screwdriver inserted into slot does not reach the lock cylinder keyhole. If a thief inserts the tip of a screwdriver into the slot 54 and attempts to force the rotation of cap 50, and thus, the lock cylinder 21 (FIG. 2), by applying a sufficiently large torque, the disk 52 turns within the sleeve 56, without turning the lock cylinder. If a thief inserts an instrument which is more slender than the screwdriver into the slot the instrument reaches the lock cylinder, however, the instrument is so slender it will break rather than overpower the lock cylinder, when a large torque is applied.

FIG. 5 depicts the ant-theft device 30 with an alternative cap 51. The cap 51 is similar in shape to the cap 50 depicted in FIGS. 2 and 4, except that it includes two indentations 60 and 62, which are shaped and positioned to engage two flanges (not shown) which are part of an alternative lock cylinder design. The cap 51 includes the same disk 52, which rotates inside the sleeve 56 a torque sufficiently larger than that required to operate the lock with the key is applied to the cap 51.

Referring to FIGS. 2 and 6, to install the anti-theft device 30, a user removes the housing 14 from steering column 10 (FIG. 1) and attaches the brackets 32 and 33 to the housing with screws 35. The screws 35 feed through the clearance holes 46 in the brackets, the mounting holes 37 in the housing and into threaded mounting holes (not shown) in the steering column. The user then slides the cover 34 over the housing 14, such that the screws 35, the top and sides of the housing 14 and the length of the lock barrel 16 are thus covered with hardened steel. The cap 50 and bezel 36 which are supported by the cover 34 fit over the end of the lock cylinder 21 to provide a secured passageway for the ignition key.

Clearance holes 40 in the cover align with threaded holes 42 in brackets 32 and 33. Break-away screws 39 are inserted through the holes 40 and tightened into the holes 42 until the heads 39a of the screws twist off the bodies 39b. Flanges on the screw bodies 39b are larger than the holes 40. These flanges ensure that the cover 34 is held in place by the screws 39. These headless screws can not be extracted from the holes 40, without drilling.

When the shroud 22 is reassembled around the steering column, covering the anti-theft device, the column resembles the steering column 10 of FIG. 1, with the exception of the differences in appearance between the bezel 18 and the bezel 36.

The anti-theft device 30, with an included torque-sensitive cap 50 or 51, renders the ignition switch inaccessible to all but the ignition key. Known devices which include different end caps are not as successful in rendering the lock cylinder inaccessible, because the end caps can be forceably removed.

The foregoing description has been limited to two specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An automobile anti-theft device for covering an ignition switch mechanism enclosed in the housing positioned on an automobile steering column, the device including:
   A. a non-deformable bracket which attaches to the housing and the steering column with screws, the bracket shaped to receive a cover; and
   B. a shaped cover which attaches to the bracket, the shaped cover covering (i) the screws by which the bracket attaches to the housing and the steering column, (ii) the housing and (iii) a lock barrel which protrudes from the housing, the shaped cover including an opening to provide access to a lock cylinder positioned within the lock barrel.

2. The automobile anti-theft device of claim 1, wherein the device further includes an end cap shaped to cover one end of the lock cylinder, the end cap being supported by the shaped cover such that the end cap is positioned in the opening in the cover, the end cap including a key slot to accommodate an ignition key.

* * * * *